(12) United States Patent
Liu

(10) Patent No.: US 10,966,147 B2
(45) Date of Patent: Mar. 30, 2021

(54) METHOD FOR CONFIGURING NETWORK SLICE INDEXES, DEVICE AND COMPUTER STORAGE MEDIUM

(71) Applicant: GUANGDONG OPPO MOBILE TELECOMMUNICATIONS CORP., LTD., Guangdong (CN)

(72) Inventor: Jianhua Liu, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 39 days.

(21) Appl. No.: 16/340,331

(22) PCT Filed: Jan. 19, 2018

(86) PCT No.: PCT/CN2018/073397
§ 371 (c)(1),
(2) Date: Apr. 8, 2019

(87) PCT Pub. No.: WO2019/140632
PCT Pub. Date: Jul. 25, 2019

(65) Prior Publication Data
US 2020/0351765 A1     Nov. 5, 2020

(51) Int. Cl.
*H04W 4/00* (2018.01)
*H04W 48/18* (2009.01)
(Continued)

(52) U.S. Cl.
CPC ........... *H04W 48/18* (2013.01); *H04W 60/00* (2013.01); *H04M 1/72519* (2013.01); *H04M 1/72522* (2013.01); *H04W 88/02* (2013.01)

(58) Field of Classification Search
CPC ..... H04W 48/18; H04W 60/00; H04W 88/02; H04W 8/245; H04M 1/72519; H04M 1/72522
(Continued)

(56) References Cited

U.S. PATENT DOCUMENTS

2013/0114393 A1* 5/2013 Lee .................... H04L 5/003
370/210
2016/0050616 A1* 2/2016 Byard .................. H04W 76/18
370/329

(Continued)

FOREIGN PATENT DOCUMENTS

CN    106572517 A    4/2017
CN    106713406 A    5/2017
(Continued)

OTHER PUBLICATIONS

Qualcomm Incorporated TS 23.501: Privacy considerations for network slicing S2-174454, SA WG2 Meeting #S2-122 Jun. 26-30, 2017.
(Continued)

*Primary Examiner* — Danh C Le
(74) *Attorney, Agent, or Firm* — Ladas & Parry, LLP

(57) ABSTRACT

Provided in the embodiments are a method for configuring network slice indexes, a device and a computer storage medium. The method may be applied to a network side device, and includes: configuring corresponding Shortened Slice Indexes (SSIs) for Network Slice Selection Assistance Information (NSSAI) of a first type of network slices based on a set partition granularity, wherein NSSAI of a network slice and an SSI corresponding to the NSSAI indicate the same network slice, and a length of the NSSAI is longer than a length of the SSI corresponding to the NSSAI; and sending a downlink message bearing the NSSAI and the correspond-
(Continued)

ing SSIs of the first type of network slices to User Equipment (UE).

18 Claims, 6 Drawing Sheets

(51) Int. Cl.
*H04W 60/00* (2009.01)
*H04M 1/725* (2021.01)
*H04W 88/02* (2009.01)

(58) Field of Classification Search
USPC .................................. 455/434, 550.1, 418
See application file for complete search history.

(56) References Cited

U.S. PATENT DOCUMENTS

| | | | |
|---|---|---|---|
| 2017/0303259 A1 | 10/2017 | Lee et al. | |
| 2018/0145737 A1* | 5/2018 | Rahman | H04B 7/0634 |
| 2018/0199278 A1* | 7/2018 | Duan | H04W 48/18 |
| 2018/0317134 A1* | 11/2018 | Leroux | H04W 24/02 |
| 2018/0324678 A1* | 11/2018 | Chen | H04W 8/08 |
| 2018/0376407 A1* | 12/2018 | Myhre | H04W 48/16 |
| 2019/0168348 A1* | 6/2019 | Wong | B25F 5/026 |
| 2019/0327317 A1* | 10/2019 | Lu | H04L 67/32 |
| 2019/0349820 A1* | 11/2019 | Zhang | H04W 36/00 |
| 2020/0137639 A1* | 4/2020 | Yuan | H04W 76/30 |

FOREIGN PATENT DOCUMENTS

| | | |
|---|---|---|
| CN | 106982458 A | 7/2017 |
| CN | 107438245 A | 12/2017 |
| WO | 2018006221 A1 | 1/2018 |
| WO | 2018234085 A1 | 12/2018 |

OTHER PUBLICATIONS

MediaTek Inc., Nokia, Nokia Shanghai Bell, Ericsson, ZTE Definition of S-NSSAI with standard/non-standard values S2-178843, SA WG2 Meeting #124, Nov. 27-Dec. 1, 2017.

Samsung, SK Telecom OI#4c Discussion: For homogeneous network slice support within RA S2-177417, SA WG2 Meeting #123, Oct. 23-27, 2017.

International Search Report and Written Opinion dated Sep. 25, 2018 in international application No. PCT/CN2018/073397 and machine translation provided by Google translate.

The extended European search report for the EP patent application No. 18880049.4, dated Jan. 28, 2020.

The second office action for the CN patent application No. 201880003782.0, dated Apr. 27, 2020.

The partial supplementary European search report for the EP patent application No. 18880049.4, dated Oct. 24, 2019.

Ericsson: "Signalling aspects of network slicing", 3GPP Draft; R2-1713276-Signalling Aspects of Network Slicing, 3rd Generation Partnership Project (3GPP), Mobile Cpmpetence Centre; 650, Route Des Lucioles; F-06921 Sophia-Antipolis Cedex, France, vol. RAN WG2, No. Reno, Nevada, USA; Nov. 27, 2017-Dec. 1, 2017 Nov. 16, 2017 (Nov. 16, 2017), XP051371224.

Nokia et al: Slice assistance Information over RRC:, 3GPP Draft; R2-1801059 Slice Assistance Information Over RRC, 3rd Generation Parnership Project (3GPP), Mobile Competence Centre; 650, Route Des Lucioles; F-06921 Sophia-Antipolis Cedex; France, vol. RAN WG2, No. Vancouver, Canada; Jan. 22, 2018-Jan. 26, 2018 Jan. 12, 2018(Jan. 12, 2018), XP051386553.

3GPP TSG-RAN WG2 #100, Reno, Nevada, USA, Nov. 27-Dec. 1, 2017, Tdoc R2-1713276.

3GPP TSG-RAN WG2 #101bis Sanya, China, Apr. 16-20, 2018, R2-1805923.

3GPP TSG-RAN WG2 Meeting #100 Reno, USA, Nov. 27-Dec. 1, 2017, R2-1712350.

The first Chinese office action for CN patent application No. 201880003782.0, dated Dec. 16, 2019.

The Communication pursuant to Article 94(3) EPC for the EP patent application No. 18880049.4, dated Aug. 27, 2020.

3GPP TS 23.501 V1.0.0 (Jun. 2017) 3rd Generation Partnership Project;Technical Specification Group Services and System Aspects; System Architecture for the 5G System; Stage 2 (Release 15).

3GPP TS 23.502 V1.0.0 (Sep. 2017) 3rd Generation Partnership Project;Technical Specification Group Services and System Aspects; Procedures for the 5G System; Stage 2 (Release 15).

* cited by examiner

METHOD FOR CONFIGURING NETWORK SLICE INDEXES, DEVICE AND COMPUTER STORAGE MEDIUM

CROSS-REFERENCE TO RELATED APPLICATION

The present application is the U.S. national phase application of PCT Application No. PCT/CN2018/073397 filed on Jan. 19, 2018, the disclosure of which is incorporated herein in its entirety by reference.

TECHNICAL FIELD

The embodiments of the disclosure relate to the technical field of radio communications, and in particular to a method for configuring network slice indexes, a device and a computer storage medium.

BACKGROUND

In a Long Term Evolution (LTE) system, in order to prevent a network overload phenomenon, an Access Control Barring (ACB) mechanism is introduced. Along with the development of communication technologies, the research on the 5th Generation (5G) mobile communication technology has already been conducted. A radio access of the 5G is called as a New Radio (abbreviated as NR). In the 5G NR, a concept of a network slice is introduced. Different network slices respectively have corresponding network slice instances at a Radio Access Network (RAN) side and a Core Network (CN) side, as a certain isolation characteristic exists among different network slice instances.

At present, a terminal can acquire network slice information only after having entered a connected state and has been attached, and a network side can only perform access control on the network slices based on a behavior that the terminal acquires the network slice information. Therefore, when the terminal is in a process of transferring from an idle state to a connected state, even if a target network slice is already overloaded, the network side can only perform, after the terminal enters the connected state, the access control on the target network slice according to a target network slice index carried in a message sent by the terminal in the connected state, and then release the terminal. In this sense, consumption of signaling resources between the terminal and the network side is increased, waste of the signaling resources between the terminal and the network side is caused, and time delay of the access control is also increased.

SUMMARY

The embodiments of the disclosure provide a method for configuring network slice indexes, a device and a computer storage medium. By using the network slice indexes configured by the technical solutions provided by the embodiments of the disclosure to perform access control, consumption of signaling resources can be reduced, waste of the signaling resources between a terminal and a network side is prevented, and time delay of the access control is reduced.

The technical solutions in the embodiments of the disclosure may be implemented as follows.

A first embodiment of the disclosure provides a method for configuring network slice indexes. The method is applied to a network side device and may include the following operations.

Corresponding Shortened Slice Indexes (SSIs) are configured for Network Slice Selection Assistance Information (NSSAI) of a first type of network slices based on a set partition granularity, wherein NSSAI of a network slice and an SSI corresponding to the NSSAI indicate the same network slice, and a length of the NSSAI is longer than a length of the SSI corresponding to the NSSAI.

A downlink message bearing the NSSAI and the corresponding SSIs of the first type of network slices is sent to User Equipment (UE).

A second embodiment of the disclosure provides a method for configuring network slice indexes. The method is applied to a UE and may include the following operations.

A downlink message bearing NSSAI and corresponding SSIs of a first type of network slices is received, wherein NSSAI of a network slice and an SSI corresponding to the NSSAI indicate the same network slice, and a length of the NSSAI is longer than a length of the SSI corresponding to the NSSAI.

A third embodiment of the disclosure provides a network side device, which may include a configuration portion and a first sending portion.

The configuration portion is configured to configure corresponding SSIs for NSSAI of a first type of network slices based on a set partition granularity, wherein NSSAI of a network slice and an SSI corresponding to the NSSAI indicate the same network slice, and a length of the NSSAI is longer than a length of the SSI corresponding to the NSSAI.

The first sending portion is configured to send a downlink message bearing the NSSAI and the corresponding SSIs of the first type of network slices to a UE.

A fourth embodiment of the disclosure provides a UE, which may include: a second receiving portion, configured to receive a downlink message bearing NSSAI and corresponding SSIs of a first type of network slices, wherein NSSAI of a network slice and an SSI corresponding to the NSSAI indicate the same network slice, and a length of the NSSAI is longer than a length of the SSI corresponding to the NSSAI.

A fifth embodiment of the disclosure provides a network side device, which may include: a first network interface, a first memory and a first processor.

The first network interface is configured to conduct signal reception and transmission in processes of receiving information from or sending information to other external network elements.

The first memory is configured to store a computer program capable of being operated on the first processor.

The first processor is configured to execute the operations of the method in the first embodiment when operating the computer program.

A sixth embodiment of the disclosure provides a UE, which may include: a second network interface, a second memory and a second processor.

The second network interface is configured to conduct signal reception and transmission in processes of receiving information from or sending information to other external network elements.

The second memory is configured to store a computer program capable of being operated on the second processor.

The second processor is configured to execute the operations of the method in the second embodiment when operating the computer program.

A seventh embodiment of the disclosure provides a computer storage medium, the computer storage medium stores a program for configuring network slice indexes, and the program for configuring the network slice indexes implements, when being executed by at least one processor, the operations of the method in the first embodiment or the second embodiment.

According to the method for configuring the network slice indexes, the device and the computer storage medium, the network side device configures the corresponding SSIs for the NSSAI and then sends the corresponding SSIs to the UE, so that the network device and the UE can both know the NSSAI and the corresponding SSIs of supported network slices. As such, when a UE subsequently needs to process relevant conditions (such as access control) on network slices with the network side, the UE can indicate the network slices by using the SSIs, so that the consumption of signaling resources is reduced, the waste of the signaling resources between the UE and the network side is prevented, and applicable scenarios for the scheme of control and processing on the network slice are expanded.

DETAILED DESCRIPTION OF THE EMBODIMENTS

Figure 1:
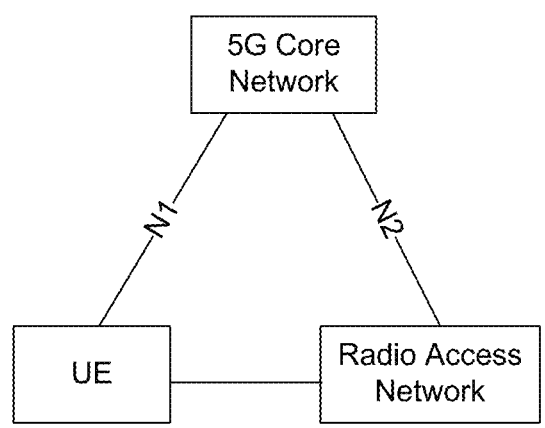
FIG. 1 illustrates a schematic diagram of a network architecture provided by an embodiment of the disclosure.

In order to be able to understand the characteristics and technical contents of the embodiments of the disclosure in more detail, the implementation of the embodiments of the disclosure will be described in detail in combination with accompanying drawings. The appended accompanying drawings are merely for reference, and are not intended to limit the embodiments of the disclosure.

At present, a concept of a network slice is proposed in a related art of a 5G system. In essence, the concept is to logically divide a physical network of an operator into multiple virtual networks. The virtual networks are divided according to different service requirements, for example, the virtual networks may be divided according to service requirement information such as a time delay, a bandwidth, a priority, safety and reliability, so that different network application scenarios can be handled flexibly. As a result, different network slices (i.e., virtual networks) are isolated from each other, and an error or a fault in one network slice does not affect normal communication of other network slices.

Based on the above description on the network slices, it may be seen that network slices may be classified into access network slices, CN slices, and data network and service slices. In this sense, for access control (AC) on the network slices, an involved network side device includes an RAN device of a 5G system, such as a gNB; and may also include a CN device of the 5G system, such as a Core Access and Mobility Management Function (AMF). Therefore, the technical solutions in the embodiments of the disclosure may be, but is not limited to be, applied to a network architecture scenario shown in FIG. 1. In this scenario, a terminal may be accessed to an RAN and is then accessed to a 5G CN via an N2 interface, and may alternatively be directly connected with the 5G CN via an N1 interface. The N1 is a Network Access Service (NAS) signaling interface between a UE and the AMF, and the N2 is an interface between the gNB and the AMF. In addition, in the scenario shown in FIG. 1, the RAN device may include the gNB; and the 5G CN device may include the AMF. In the architecture shown in FIG. 1, for a single AMF, there may be one or more RAN devices. For example, the gNB may provide communication coverage for multiple cells, and generally, these cells may be configured into a same Tracking Area (TA). In other words, the multiple cells may be configured to belong to the same TA. However, a single cell can only belong to one TA.

The UE may include a cellular phone, an intelligent phone, a Session Initiation Protocol (SIP) phone, a laptop computer, a Personal Data Assistant (PDA), a satellite radio, a global positioning system, a multimedia device, a video device, a digital audio player (such as an MP3 player), a camera, a game console, a tablet computer, or any other devices having a similar function. Meanwhile, the UE may further be called by a person skilled in the art as a terminal, a mobile station, a subscriber station, a mobile unit, a subscriber unit, a radio unit, a remote unit, a mobile device, a radio device, a radio communication device, a remote device, a mobile subscriber station, an access terminal, a mobile terminal, a radio terminal, a remote terminal, a handset, a user proxy, a mobile client, a client or some other suitable term.

Based on the network architecture shown in FIG. 1, in a related network slice mechanism, NSSAI is generally adopted to identify the network slices. The NSSAI includes Service and Slice Type (SST) information and a Service and Slice Differentiator (SSD), and a total length of the SST and the SSD is 32 bits. Therefore, a length of the NSSAI for identifying a single network slice is at least 32 bits. Each UE can concurrently support 8 network slices at present. For each UE, therefore, index information of supported network slices, that is, a total length of the NSSAI may be up to 32*8=256 bits at maximum. Such a length is far greater than a length supported by a transmission message in some transmission channels. For example, a length supported by a third type of message MSG3 on a Common Control Channel (CCCH) is restricted to be 48 bits. Therefore, when related control and processing need to be performed on the network slices between the UE and the network side device, the NSSAI can only be transmitted on a transmission channel supporting a large transmission message. Therefore, not only consumption of signaling resources is increased, but waste of the signaling resources between the UE and the network side is also caused, and application scenarios of the scheme for related control and processing on the network slices are restricted.

Taking into consideration the above content, the embodiments of the disclosure provide a method for configuring network slice indexes, a device and a computer storage medium to implement the configuration of SSIs, so that the consumption of the signaling resources is saved, and the application scenarios for the scheme of control and processing on the network slices are further expanded. In view of this, the following embodiments are proposed.

Embodiment 1

Figure 2:
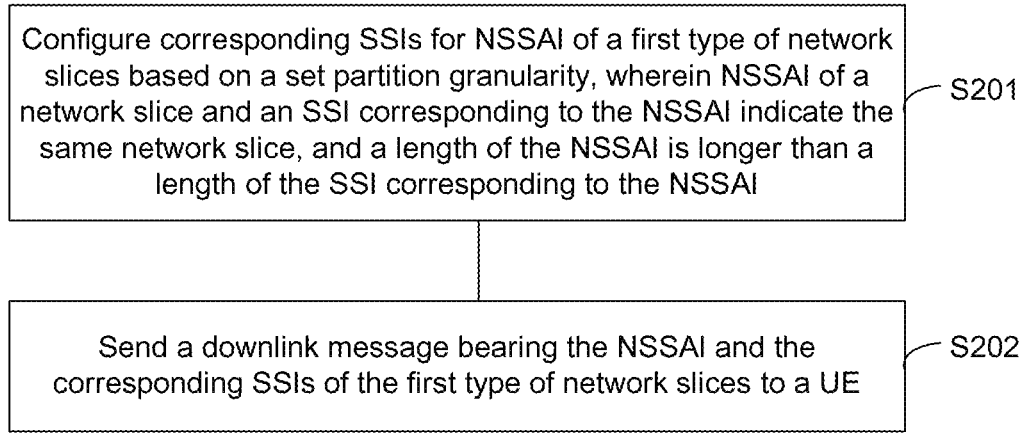
FIG. 2 illustrates a flowchart schematic diagram of a method for configuring network slice indexes provided by an embodiment of the disclosure.

See FIG. 2, which illustrates a method for configuring network slice indexes provided by an embodiment of the disclosure. The method is applied to a network side device. The network side device may include an RAN device, such as a gNB, and may also include a CN device, such as an AMF. The method may include the following operations in blocks S201 and S202 illustrated in FIG. 2.

In block S201, corresponding SSIs are configured for NSSAI of a first type of network slices based on a set partition granularity, wherein NSSAI of a network slice and an SSI corresponding to the NSSAI indicate the same network slice, and a length of the NSSAI is longer than a length of the SSI corresponding to the NSSAI.

In block S202, a downlink message bearing the NSSAI and the corresponding SSIs of the first type of network slices is sent to a UE.

In at least one exemplary implementation of the embodiment the first type of network slices includes registered network slices or network slices configured for the UE. Correspondingly, NSSAI of the registered network slices may be Allowed NSSAI, and NSSAI of the network slices configured for the UE may be Configured NSSAI.

Based on the technical solutions shown in FIG. 2, for a UE in a connected state, agreement between the network device and the UE on the correspondence between NSSAI and corresponding SSIs of supported network slices is achieved. As such, when a UE subsequently needs to process relevant conditions (such as access control) on network slices with the network side, the UE can indicate the network slices by using the SSIs, so that the consumption of signaling resources is reduced, the waste of the signaling resources between the UE and the network side is prevented, and applicable scenarios for the scheme of control and processing on the network slice are expanded.

In an exemplary embodiment, for the registered network slices, the operation that the downlink message bearing the NSSAI and the corresponding SSIs of the first type of network slices is sent to the UE may include: a registration response message bearing the NSSAI and the corresponding SSIs of the registered network slices is sent to the UE. When the UE is in an inactive state and an idle state, the network side device maintains NSSAI of network slices registered by the terminal. Therefore, after the UE executes a registration process, the network side device may bear the NSSAI and the corresponding SSIs of the registered network slices into the registration response message to send to the UE.

In the exemplary embodiment, the network side device may further configure the network slices for the UE in a registration process after the UE is started. Therefore, before the corresponding SSIs are configured for the NSSAI of the first type of network slices based on the set partition granularity, the method may further include the following operation.

Network slices are configured for the UE in a registration process of the UE.

Correspondingly, the operation that the downlink message bearing the NSSAI and the corresponding SSIs of the first type of network slices is sent to the UE may include the following operation.

A registration response message bearing the NSSAI and the corresponding SSIs of the network slices configured for the UE is sent to the UE. Since the network side configures the network slices for the UE when the UE is registered, the NSSAI and the corresponding SSI of the network slice configured for the UE may be born into the registration response message to send to the UE.

For the technical solutions shown in FIG. 2, in an exemplary implementation manner, the set partition granularity at least includes one of: taking a TA as a granularity, taking a Routing Area (RA) as a granularity and taking a UE as a granularity. In view of this, the downlink message may further include indication information for indicating the set partition granularity, so that the UE can obtain the NSSAI and the corresponding SSIs of the network slices according to the set partition granularity as indicated.

For the above implementation manner, when the UE is registered to multiple TAs, and the set partition granularity includes taking the TA as the granularity, the operation that the corresponding SSIs are configured for the NSSAI of the first type of network slices based on the set partition granularity may include the following operations.

According to the number of first type of network slices in respective TA, an SSI length in the respective TA is determined.

Based on the SSI length in the respective TA, the corresponding SSIs are uniformly configured for the NSSAI of the first type of network slices in the respective TA.

For the above implementation manner, when the set partition granularity includes taking the RA as the granularity, the operation that the corresponding SSIs are configured for the NSSAI of the first type of network slices based on the set partition granularity may include the following operations.

According to a number of first type of network slices in respective RA, an SSI length in the respective RA is determined.

Based on the SSI length in the respective RA, the corresponding SSIs are uniformly configured for the NSSAI of the first type of network slices in the respective RA.

For the above implementation manner, when the set partition granularity includes taking the UE as the granularity, the operation that the corresponding SSIs are configured for the NSSAI of the first type of network slices based on the set partition granularity may include: the corresponding SSIs are uniformly configured for the NSSAI of the first type of network slices corresponding to the UE.

Figure 3:
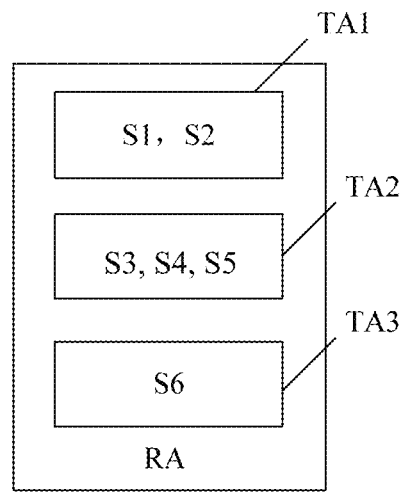
FIG. 3 illustrates a schematic diagram of an area where network slices are located provided by an embodiment of the disclosure.

Since the UE can be registered to multiple TAs or RAs, it is suggested to configure SSIs for network slices on different TAs or RAs. For example, it is assumed that six network slices are respectively registered by the UE to S1 to S6, corresponding slice indexes respectively are NSSAI a, NSSAI b, NSSAI c, NSSAI d, NSSAI e and NSSAI f. The six network slices are respectively located in a TA1, a TA2 and a TA3. In the example, as shown in FIG. 3, the S1 and the S2 are located in the TA1, the S3, the S4 and the S5 are located in the TA2, and the S6 is located in the TA3.

For the above example with the TA as the granularity, an SSI length in the TA is determined first according to the number of slices in the respective TA. For example, it is assumed that the number of slices in one TA is n, when the n is 1 or 2, the SSI length is 1 bit; when the n is 3 or 4, the SSI length is 2 bits; and when the n is 5 or 6 or 7 or 8, the SSI length is 3 bits. In view of this, based on the SSI length in the respective TA, the corresponding SSIs are uniformly configured for the NSSAI of the first type of network slices in the respective TA. It may be seen that since the S1 and the S2 are located in the TA1, the SSI length is 1 bit and the S1 and the S2 are respectively and uniformly numbered as 0 and 1 in the TA1. Since the S3, the S4 and the S5 are located in the TA2, the SSI length is 2 bits, and the S3, the S4 and the S5 are respectively and uniformly numbered as 0, 1 and 2 in the TA2. Since the S6 is located in the TA3, the SSI length is 1 bit and the S6 is uniformly numbered as 1 in the TA3. The above numbers are combined with TA indexes, so the configuration of corresponding SSIs for NSSAI of the network slices S1-S6 with the TA as the granularity is completed.

For the above example with the RA as the granularity, it is assumed that the S1 to the S6 are located in a same RA. As shown in FIG. 3, the S1 to the S6 are uniformly numbered in the RA, and the S1 to the S6 in the RA are respectively numbered as 1, 2, 3, 4, 5, 6. It is assumed that other N slices are registered by the UE and are located in another RA, the N slices in another RA are uniformly numbered and are respectively numbered as 1, 2, 3, . . . N. At last, the number of respective network slice in the RA is combined with an index of an RA where respective network slice is located, so the configuration of corresponding SSIs for NSSAI of the network slices with the RA as the granularity is completed.

Since the network slices S1 to S6 registered by the UE are located in the same RA, when the UE is taken as the granularity, the S1 to the S6 are uniformly numbered and are numbered as 1, 2, 3, 4, 5, 6. Therefore, a numbering result with the UE as the granularity is consistent with a numbering result with the RA as the granularity when the network slices S1 to S6 registered by the UE are located in the same RA. For example, a specific numbering example is as shown in table 1.

TABLE 1

| Slice index | With RA as granularity | With TA as granularity |
|---|---|---|
| NSSAI a | SSI = 0 | TA = 1, SSI = 0 |
| NSSAI b | SSI = 1 | TA = 1, SSI = 1 |
| NSSAI c | SSI = 2 | TA = 2, SSI = 0 |
| NSSAI d | SSI = 3 | TA = 2, SSI = 1 |
| NSSAI e | SSI = 4 | TA = 2, SSI = 2 |
| NSSAI f | SSI = 5 | TA = 3, SSI = 1 |

The above not only can be applied to configuring the SSIs for the NSSAI of the first type of network slices, but also can be applied to configuring SSIs for NSSAI of network slices, sent to the terminal, of other networks, which will not be repeated herein.

When the agreement has already be reached for NSSAI and corresponding SSIs of supported network slices between the network side device and the UE, under a condition in which addition, deletion or modification of NSSAI is involved, a flush operation may further be operated, i.e., corresponding SSIs are reconfigured for the NSSAI.

For the technical solutions shown in FIG. 2, beside that the network side sends the NSSAI and the corresponding SSIs to the terminal, the terminal may also send the NSSAI and the corresponding SSIs to the network side. In an exemplary implementation manner, the method may further include the following operation.

NSSAI of a second type of network slices, as well as corresponding SSIs configured by the UE for the NSSAI of the second type of network slices is received from the UE, wherein the second type of network slices are network slices (referred to as Requested NSSAI), for which the UE requests to configure corresponding SSIs for NSSAI, comprised in registered network slices or network slices configured for the UE If the Requested NSSAI is based on the Configured NSSAI, and no SSI is provided for the NSSAI in the Configured NSSAI, the terminal conduct SSI numbering for the Requested NSSAI based on the Configured NSSAI and reports the numbers to the network side.

Likewise, if the Requested NSSAI is based on the Allowed NSSAI, and no SSI is provided for the NSSAI in the Allowed NSSAI, the terminal conduct SSI numbering for the Requested NSSAI based on the Allowed NSSAI and reports the numbers to the network side.

In terms of a specific network side device, a specific object to which the terminal sends the NSSAI and the corresponding SSIs may be an access device (such as a gNB), or a CN device (such as an AMF), or both the access device and the CN device (the gNB and the AMF). Therefore, for different cases of the specific object, an applicable environment for the NSSAI and the corresponding SSIs, send by the terminal, of the second type of network slices also correspondingly has the following differences.

Case 1: in a case where only an access device receives the NSSAI of the second type of network slices and the corresponding SSIs configured by the UE for the NSSAI of the second type of network slices, the corresponding SSIs configured by the UE for the NSSAI of the second type of network slices are only applied to an Access Stratum (AS).

Such a case is only applicable to the UE in the connected state. The UE only provides a corresponding relationship between the SSIs and the NSSAI to the gNB, and the corresponding relationship is transparent to the AMF. If the SSIs are only used by the UE in the connected state in an air interface, after the corresponding relationship between the SSIs and the NSSAI is established, the UE may use the SSIs to replace the NSSAI.

Case 2: in a case where only a CN device receives the NSSAI of the second type of network slices and the corresponding SSIs configured by the UE for the NSSAI of the second type of network slices, the corresponding SSIs configured by the UE for the NSSAI of the second type of network slices are only applied to a Non-Access Stratum (NAS).

Such a case mainly concerns a condition in which the UE is in the idle state, a context of the UE is not stored by the gNB, and thus the corresponding relationship between the SSIs and the NSSAI cannot be sensed by a base station.

Case 3: in a case where an access device and a CN device receive the NSSAI of the second type of network slices and the corresponding SSIs configured by the UE for the NSSAI of the second type of network slices, the corresponding SSIs configured by the UE for the NSSAI of the second type of network slices can be applied to an AS and an NAS.

Such a case is applicable to a condition in which the UE is in the inactive state and the connected state. When the UE is in the inactive state, the corresponding relationship between the SSIs and the NSSAI is at least stored in an anchor gNB. When the UE is in the connected state, the corresponding relationship between the SSIs and the NSSAI may be stored in a serving gNB and the AMF.

In addition, the method may further include: NSSAI of unregistered network slices and corresponding SSIs configured by the UE for the NSSAI of the unregistered network slices, which are sent after the UE is registered successfully, are received.

For network slices not registered in the network side device, the UE is unconstrained to adopt an SSI. Since there is no information on these network slices in the network side device, even though the network is registered, the Allowed NAASI may still not be accommodated and configured. Therefore, optionally, for these network slices, the SSIs may be numbered after the UE is registered successfully.

According to the method for configuring the network slice indexes provided by this embodiment, the network side device configures the corresponding SSIs for the NSSAI and then sends the corresponding SSIs to the UE, so that the network device and the UE can both know the NSSAI and the corresponding SSIs of supported network slices. In this way, when a UE subsequently needs to process relevant conditions (such as access control) on network slices with the network side, the UE can indicate the network slices by using the SSIs, so that the consumption of signaling resources is reduced, the waste of the signaling resources between the UE and the network side is prevented, and applicable scenarios for the scheme of control and processing on the network slice are expanded.

Embodiment 2

Figure 4:
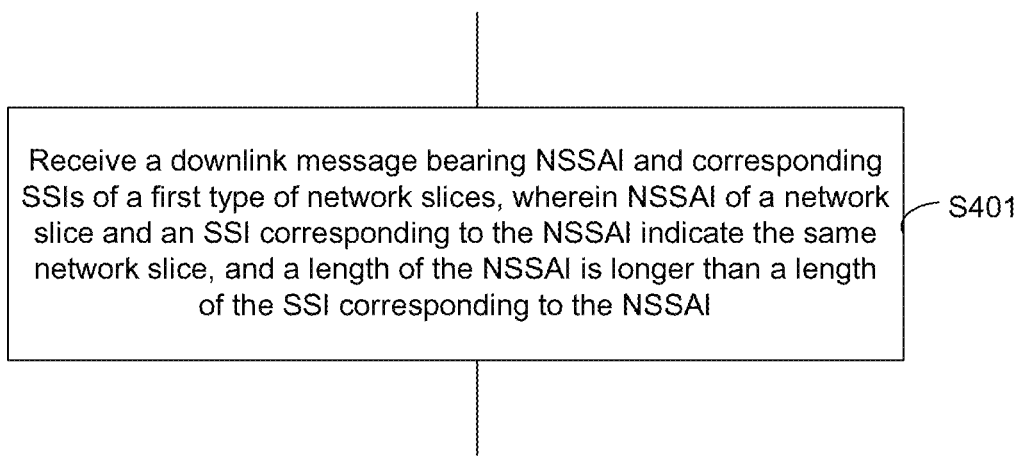
FIG. 4 illustrates a flowchart schematic diagram of another method for configuring network slice indexes provided by an embodiment of the disclosure.

Based on an inventive concept same as the foregoing embodiment, see FIG. 4, which illustrates a method for configuring network slice indexes provided by an embodiment of the disclosure. The method is applied to a UE, and may include the following operation in block S401 illustrated in FIG. 4.

In block S401, a downlink message bearing NSSAI and corresponding SSIs of a first type of network slices is received, wherein NSSAI of a network slice and an SSI corresponding to the NSSAI indicate the same network slice, and a length of the NSSAI is longer than a length of the SSI corresponding to the NSSAI.

In an exemplary implementation manner, the method may further include the following operations.

Corresponding SSIs are set for NSSAI of a second type of network slices, wherein the second type of network slices are network slices, for which the UE requests to configure the corresponding SSIs for the NSSAI, included in registered network slices or network slices configured for the UE.

The NSSAI and the corresponding SSIs of the second type of network slices are sent to the network side device.

In the above implementation manner, in a case where the NSSAI and the corresponding SSIs of the second type of network slices are sent to an access device only, the SSIs corresponding to the NSSAI of the second type of network slices are only applied to an AS.

In a case where the NSSAI and the corresponding SSIs of the second type of network slices are sent to a CN device only, the SSIs corresponding to the NSSAI of the second type of network slices are only applied to an NAS.

In a case where the NSSAI and the corresponding SSIs of the second type of network slices are sent to an access device and a CN device, the SSIs corresponding to the NSSAI of the second type of network slices can be applied to an AS and an NAS.

In the above implementation manner, the method may further include the following operations.

Corresponding SSIs are configured for NSSAI of unregistered network slices.

The NSSAI of the unregistered network slices and the SSIs corresponding to the NSSAI of the unregistered network slices are sent to the network side device.

In this embodiment, the specific description on each implementation manner is as mentioned in the first embodiment and will not be repeated herein.

Embodiment 3

Figure 5:
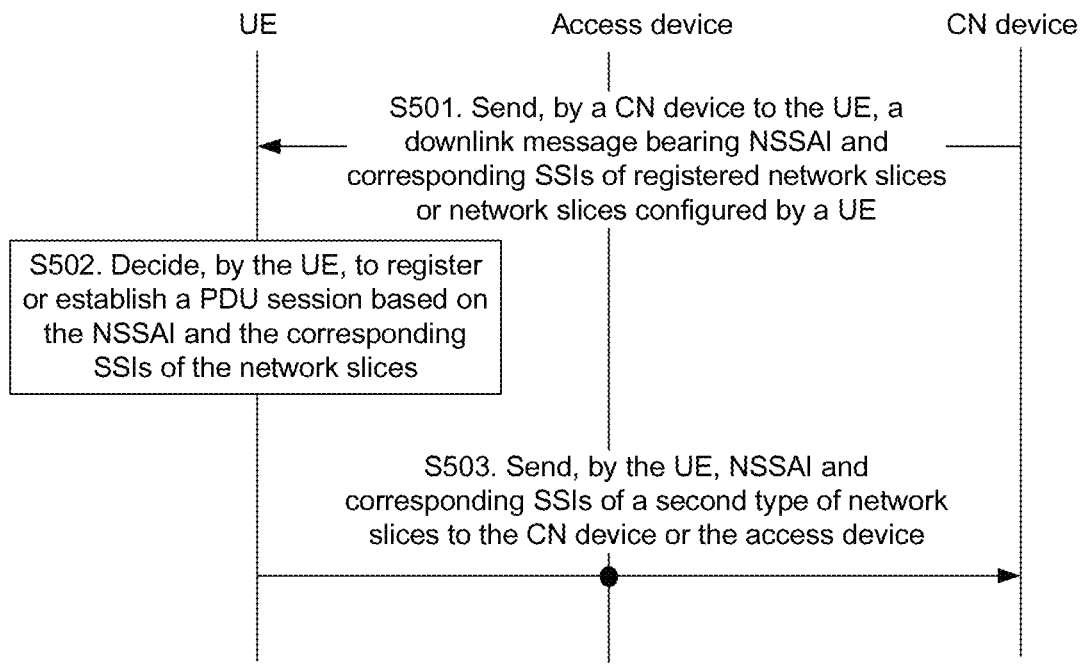
FIG. 5 illustrates a schematic diagram of a specific flowchart for configuring network slice indexes provided by an embodiment of the disclosure.

Based on an inventive concept same as the foregoing embodiment, see FIG. 5, which illustrates a detailed process for configuring network slice indexes provided by an embodiment of the disclosure. The process may include the following operations in blocks S501 to S503 illustrated in FIG. 5.

In block S501, a CN device sends a downlink message bearing NSSAI and corresponding SSIs of registered network slices or network slices configured by a UE to the UE.

The CN device sends the downlink message to the UE after completing configuring the SSIs for the NSSAI of the registered network slices or the network slices configured for the UE, and thus the consistency between the network side and the UE on the NSSAI and the corresponding SSIs of supported network slices is implemented.

In block S502, the UE decides to register or establish, based on the NSSAI and the corresponding SSIs of the above network slices, a Protocol Data Unit (PDU) session.

After the consistency is achieved, when a UE subsequently needs to process relevant conditions (such as access control) on the registered network slices or the network slices configured for the UE with the network side, the UE can indicate the network slices by using the SSIs, and thus the consumption of the signaling resources is reduced.

In block S503, the UE sends NSSAI and corresponding SSIs of a second type of network slices to the CN device or the access device.

The second type of network slices are network slices, for which the UE requests to configure corresponding SSIs for NSSAI, included in registered network slices or network slices configured for the UE.

A specific description on the operation in block S503 is referred to the foregoing embodiment, and will not be repeated in this embodiment.

Embodiment 4

Figure 6:
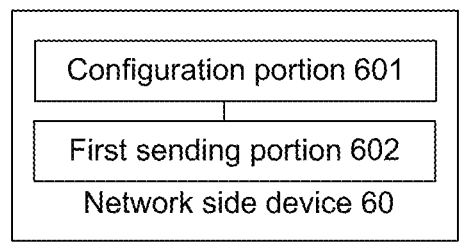
FIG. 6 illustrates a compositional schematic diagram of a network side device provided by an embodiment of the disclosure.

Based on an inventive concept same as the foregoing embodiment, see FIG. 6, which illustrates a network side device 60 provided by an embodiment of the disclosure. The network side device 60 may include an RAN device, such as a gNB, and may also include a CN device, such as an AMF. The network side device 60 includes: a configuration portion 601 and a first sending portion 602.

The configuration portion 601 is configured to configure corresponding SSIs for NSSAI of a first type of network slices based on a set partition granularity, wherein NSSAI of a network slice and an SSI corresponding to the NSSAI indicate the same network slice, and a length of the NSSAI is longer than a length of the SSI corresponding to the NSSAI.

The first sending portion 602 is configured to send a downlink message bearing the NSSAI and the corresponding SSIs of the first type of network slices to a UE.

In the above solutions, the first type of network slices may include registered network slices or network slices configured for the UE.

In the above solutions, the first sending portion 602 is configured to send a registration response message bearing the NSSAI and the corresponding SSIs of the registered network slices to the UE.

In the above solutions, the configuration portion 601 is further configured to configure the network slices for the UE in a registration process of the UE before the corresponding SSIs are configured for the NSSAI of the first type of network slices based on the set partition granularity.

Correspondingly, the first sending portion 602 is configured to send to the UE a registration response message bearing NSSAI and corresponding SSIs of the network slices configured for the UE.

In the above solutions, the set partition granularity at least includes one of: taking an TA as a granularity, taking an RA as a granularity and taking a UE as a granularity.

In the above solutions, the downlink message further bears indication information for indicating the set partition granularity.

In the above solutions, when the UE is registered to multiple TA and the set partition granularity includes taking the TA as the granularity, the configuration portion 601 is configured to.

determine, according to the number of first type of network slices in respective TA, an SSI length in the respective TA.

uniformly configure, based on the SSI length in the respective TA, the corresponding SSIs for the NSSAI of the first type of network slices in the respective TA.

In the above solutions, when the set partition granularity includes taking the RA as the granularity, the configuration portion 601 is configured to:

determine, according to a number of first type of network slices in respective RA, an SSI length in the respective RA;

uniformly configure, based on the SSI length in the respective RA, the corresponding SSIs for the NSSAI of the first type of network slices in the respective RA.

In the above solutions, when the set partition granularity includes taking the UE as the granularity, the configuration portion 601 is configured to uniformly configure SSIs for the NSSAI of the first type of network slices corresponding to the UE.

Figure 7:
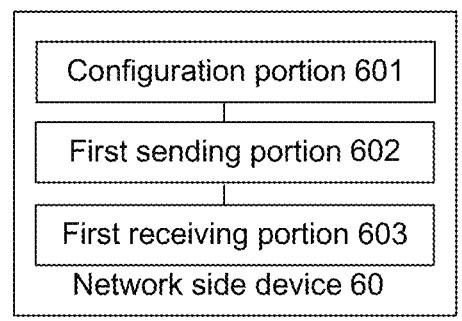
FIG. 7 illustrates a compositional schematic diagram of another network side device provided by an embodiment of the disclosure.

In the above solution, referring to FIG. 7, the network side device 60 may further include: a first receiving portion 701, configured to receive, from the UE, NSSAI of a second type of network slices, as well as corresponding SSIs configured by the UE for the NSSAI of the second type of network slices, wherein the second type of network slices are network slices, for which the UE requests to configure the corresponding SSIs for the NSSAI, included in registered network slices or network slices configured for the UE.

In the above solutions, in a case where only an access device receives the NSSAI of the second type of network slices and the corresponding SSIs configured by the UE for the NSSAI of the second type of network slices, the corresponding SSIs configured by the UE for the NSSAI of the second type of network slices are only applied to an AS.

In a case where only a CN device receives the NSSAI of the second type of network slices and the corresponding SSIs configured by the UE for the NSSAI of the second type of network slices, the corresponding SSIs configured by the UE for the NSSAI of the second type of network slices are only applied to an NAS.

In a case where an access device and a CN device receive the NSSAI of the second type of network slices and the corresponding SSIs configured by the UE for the NSSAI of the second type of network slices, the corresponding SSIs configured by the UE for the NSSAI of the second type of network slices can be applied to an AS and an NAS.

In the above solutions, the first receiving portion 701 is further configured to receive NSSAI of unregistered network slices and corresponding SSIs configured by the UE for the NSSAI of the unregistered network slices, which are sent after the UE is registered successfully.

In this embodiment, the "portion" may be a partial circuit, a partial processor, a partial program or software, and the like, and certainly may also be a unit, and may further be modular or non-modular.

In addition, each compositional portion in this embodiment may be integrated into one processing unit, or each of the units may exist alone physically, or two or more units are integrated into one unit. The integrated unit may be implemented in a form of hardware, and may also be implemented in a form of a software functional module.

When the integrated units are implemented in the form of the software functional unit and sold or used as an independent product, the units may be stored in a computer-readable storage medium. Based on such an understanding, the technical solutions of the disclosure essentially, or the part contributing to the prior art, or some of the technical solutions may be implemented in a form of a software product. The computer software product is stored in a storage medium and includes several instructions for instructing a computer device (which may be a personal computer, a server, or a network device) to perform all or some of the operations of the methods described in the embodiments of the disclosure. The foregoing storage medium includes any medium that can store a program code, such as a U disk, a removable hard disk, a Read Only Memory (ROM), a Random Access Memory (RAM), a magnetic disk, or an optical disc.

Therefore, an embodiment of the disclosure provides a computer storage medium; the computer storage medium stores a program for configuring network slice indexes; and the program for configuring the network slice indexes implements, when being executed by at least one processor, the operations of the method in the first embodiment.

Figure 8:
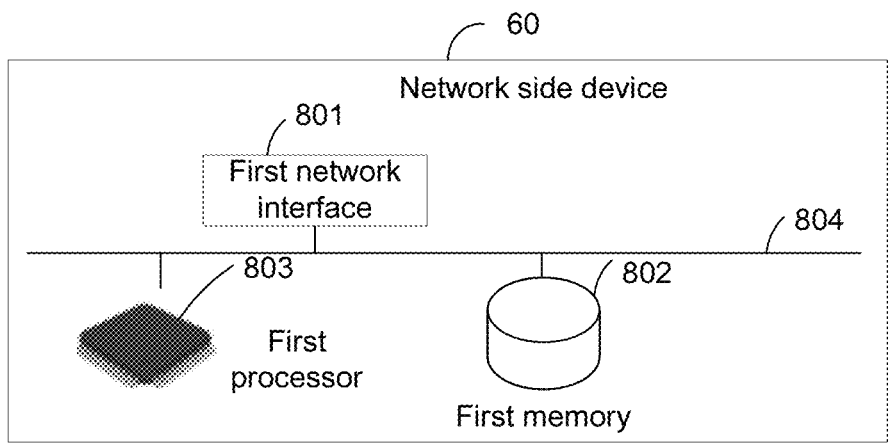
FIG. 8 illustrates a schematic diagram of a specific hardware structure of a network side device provided by an embodiment of the disclosure.

Based on the network side device 60 and the computer storage medium, see FIG. 8, which illustrates a specific hardware structure of a network side device 60 provided by an embodiment of the disclosure. The network side device 60 may include: a first network interface 801, a first memory 802 and a first processor 803; and each component is coupled together via a bus system 804. The bus system 804 is configured to implement connection and communication among these components. Except for a data bus, the bus system 804 may further include a power bus, a control bus and a state signal bus. However, for the clarity, each bus in FIG. 8 is marked as the bus system 804. The first network interface 801 is configured to conduct signal reception and transmission in processes of receiving information from or sending information to other external network elements.

The first memory 802 is configured to store a computer program capable of being operated on the first processor 803.

The first processor 803 is configured to execute the following operations when operating the computer program.

Corresponding SSIs are configured for NSSAI of a first type of network slices based on a set partition granularity, wherein NSSAI of a network slice and an SSI corresponding to the NSSAI indicate the same network slice, and a length of the NSSAI is longer than a length of the SSI corresponding to the NSSAI.

A downlink message bearing the NSSAI and the corresponding SSI of the first type of network slice is sent to UE.

The first memory 802 in this embodiment may be a volatile memory or a non-volatile memory, or may include the volatile memory and the non-volatile memory. The non-volatile memory may be an ROM, a Programmable ROM (PROM), an Erasable PROM (EPROM), an Electrically EPROM (EEPROM) or a flash memory. The volatile memory may be an RAM and is used as an external high-speed cache. Through exemplary but not restrictive description, RAMs in many forms are available, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM) and a Direct Rambus RAM (DR RAM). The first memory 802 of the system and the method described herein is intended to include but not limited to these memories and any other suitable type of memory.

The first processor 803 may be an integrated circuit chip, and has signal processing capability. During an implementation process, each operation of the method may be completed via an integrated logic circuit of hardware in the first processor 803 or an instruction in a software form. The first processor 803 may be a universal processor, a Digital Signal Processor (DSP), an Application Specific Integrated Circuit (ASIC) and a Field Programmable Gate Array (FPGA) or other programmable logic devices, discrete gates or transistor logic devices, and discrete hardware components. The processor may implement or execute each method, operation and logic block diagram disclosed in the embodiments of the disclosure. The universal processor may be a microprocessor or the processor may also be any conventional processor, etc. Steps of the methods disclosed in combination the embodiments of the disclosure may be directly executed and accomplished by means of a hardware decoding processor or may be executed and accomplished using a combination of hardware and software modules in the decoding processor. The software module may be located in a mature storage medium in the art, such as an RAM, a flash memory, an ROM, a PROM, an EEPROM or a register. The storage medium is located in the first memory 802; the first processor 803 reads information in the first memory 802, and completes the operations of the above method in combination with hardware thereof.

These embodiments described herein may be implemented by using hardware, software, firmware, middleware, a microcode or a combination thereof. For the implementation of the hardware, a processing unit may be implemented in one or more of an Application Specific Integrated Circuits (ASIC), a Digital Signal Processing (DSP), a DSP Device (DSPD), a Programmable Logic Device (PLD), a Field-Programmable Gate Array (FPGA), a universal processor, a controller, a microcontroller, a microprocessor, and other electronic units configured to execute the functions of the disclosure or a combination thereof.

For the implementation of the software, technologies used herein may be implemented via modules for executing the functions of the disclosure (such as a process and a function, etc.). The software code may be stored in the memory and is executed via the processor. The memory may be implemented in the processor or out of the processor.

In at least one exemplary embodiment, the first processor 803 in the network side device 60 is further configured to execute, when operating the computer program, the operations of the method in the first embodiment, which will not be repeated here.

Embodiment 5

Figure 9:
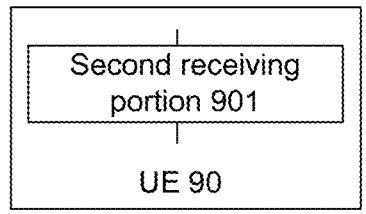
FIG. 9 illustrates a compositional schematic diagram of a UE provided by an embodiment of the disclosure.

Based on an inventive concept same as the foregoing embodiment, see FIG. 9, which illustrates a composition of a UE 90 provided by an embodiment of the invention. The UE 90 may include: a second receiving portion 901, configured to receive a downlink message bearing NSSAI and corresponding SSIs of a first type of network slices, wherein NSSAI of a network slice and an SSI corresponding to the NSSAI indicate the same network slice, and a length of the NSSAI is longer than a length of the SSI corresponding to the NSSAI.

Figure 10:
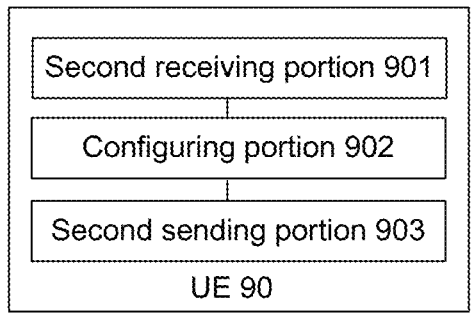
FIG. 10 illustrates a compositional schematic diagram of another UE provided by an embodiment of the disclosure.

In the above solutions, referring to FIG. 10, the UE 90 may further include: a configuring portion 1001 and a second sending portion 1002. The configuring portion 1001 is configured to configure corresponding SSIs for the NSSAI of the second type of network slices, wherein the second type of network slices are network slices, for which the UE requests to configure the corresponding SSIs for the NSSAI, included in registered network slices or network slices configured for the UE.

The second sending portion 1002 is configured to send the NSSAI and the corresponding SSIs of the second type of network slices to the network side device.

In the above solutions, in a case where the NSSAI and the corresponding SSIs of the second type of network slices are sent to an access device only, the SSIs corresponding to the NSSAI of the second type of network slices are only applied to an AS.

In a case where the NSSAI and the corresponding SSIs of the second type of network slices are sent to a CN device only, the SSIs corresponding to the NSSAI of the second type of network slices are only applied to an NAS.

In a case where the NSSAI and the corresponding SSIs of the second type of network slices are sent to an access device and a CN device the SSIs corresponding to the NSSAI of the second type of network slices can be applied to an AS and an NAS.

In the above solutions, the configuring portion 1001 is further configured to perform the following operation.

Corresponding SSIs are configured for NSSAI of unregistered network slices.

The sending portion is further configured to send the NSSAI of the unregistered network slices and the SSIs corresponding to the NSSAI of the unregistered network slices to the network side device.

In addition, an embodiment of the disclosure provides a computer storage medium; the computer storage medium stores a program for configuring network slice indexes; and the program for configuring the network slice indexes implements, when being executed by at least one processor, the operations of the method in the second embodiment. A specific description on the computer storage medium is referred to the description in the fourth embodiment and will not be repeated herein.

Figure 11:
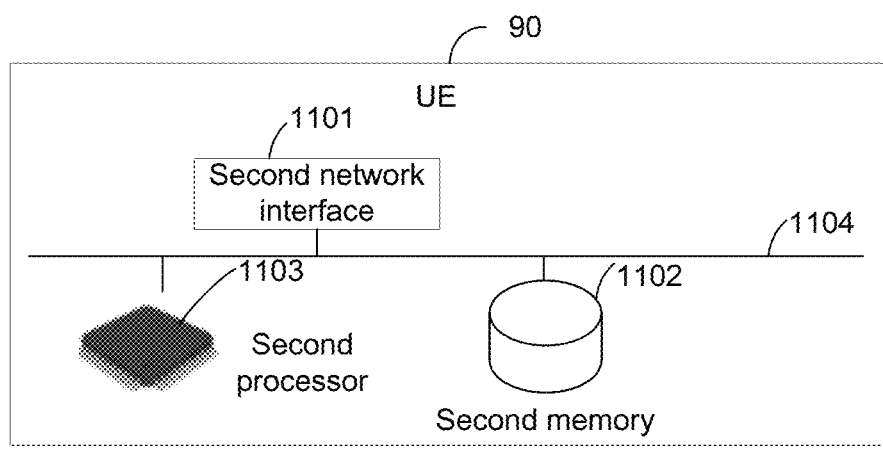
FIG. 11 illustrates a schematic diagram of a specific hardware structure of a UE provided by an embodiment of the disclosure.

Based on the structure of UE 90 and the computer storage medium, see FIG. 11, the figure illustrates a specific hardware structure of the UE 90 provided by an embodiment of the disclosure. The UE 90 may include: a second network interface 1101, a second memory 1102 and a second processor 1103. Each component is coupled together via a bus system 1104. The bus system 1104 is configured to implement connection and communication among these components. Besides a data bus, the bus system 1104 may further include a power bus, a control bus and a state signal bus. However, for clarity, each bus in FIG. 11 is marked as the bus system 1104. The second network interface 1101 is configured to conduct signal reception and transmission in processes of receiving information from or sending information to other external network elements.

The second memory 1102 is configured to store a computer program capable of being operated on the second processor 1103.

The second processor 1103 is configured to execute the following operation when operating the computer program: a downlink message bearing NSSAI and corresponding SSIs of a first type of network slices is received, wherein NSSAI of a network slice and an SSI corresponding to the NSSAI indicate the same network slice, and a length of the NSSAI is longer than a length of the SSI corresponding to the NSSAI.

Components in the specific hardware structure of the UE 90 in this embodiment are similar to corresponding portions in the fifth embodiment, and will not be repeated here.

In at least one exemplary embodiment, the second processor 1103 in the UE 90 is further configured to execute, when operating the computer program, the operations of the method in the second embodiment, which will not be repeated here.

The above are only exemplary embodiments of the disclosure, and are not intended to limit a scope of protection of the disclosure.

INDUSTRIAL APPLICABILITY

In the embodiments of the disclosure, the network side device configures the corresponding SSI for the NSSAI and then sends the corresponding SSI to the UE, so that the network device and the UE can both know the NSSAI and the corresponding SSIs of supported network slices. As such, when a UE subsequently needs to process relevant conditions (such as access control) on network slices with the network side, the UE can indicate the network slices by using the SSIs, so that consumption of signaling resources is reduced, waste of the signaling resources between the UE and the network side is prevented, and applicable scenarios for performing control and processing on the network slices are expanded.

What is claimed is:

1. A method for configuring network slice indexes, being applied to a network side device and comprising:
configuring corresponding Shortened Slice Indexes (SSIs) for Network Slice Selection Assistance Information (NSSAI) of a first type of network slices based on a set partition granularity, wherein NSSAI of a network slice and an SSI corresponding to the NSSAI indicate the same network slice, and a length of the NSSAI is longer than a length of the SSI corresponding to the NSSAI; and
sending a downlink message bearing the NSSAI and the corresponding SSIs of the first type of network slices to User Equipment (UE);
wherein the first type of network slices comprises registered network slices or network slices configured for the UE; and
sending the downlink message bearing the NSSAI and the corresponding SSIs of the first type of network slices to the UE comprises: sending a registration response message bearing the NSSAI and the corresponding SSIs of the registered network slices to the UE.

2. The method as claimed in claim 1, wherein before configuring the corresponding SSIs for the NSSAI of the first type of network slices based on the set partition granularity, the method further comprises:
configuring the network slices for the UE in a registration process of the UE; and
correspondingly, sending the downlink message bearing the NSSAI and the corresponding SSIs of the first type of network slices to the UE comprises:
sending to the UE a registration response message bearing the NSSAI and the corresponding SSIs of the network slices configured for the UE.

3. The method as claimed in claim 1, wherein the set partition granularity at least comprises one of: taking a Tracking Area (TA) as a granularity, taking a Routing Area (RA) as a granularity and taking a UE as a granularity.

4. The method as claimed in claim 3, wherein the downlink message further bears indication information for indicating the set partition granularity.

5. The method as claimed in claim 3, wherein when the UE is registered to multiple TAs and the set partition granularity comprises taking the TA as the granularity, configuring the corresponding SSIs for the NSSAI of the first type of network slices based on the set partition granularity comprises:
determining, according to a number of first type of network slices in respective TA, an SSI length in the respective TA; and
based on the SSI length in the respective TA, uniformly configuring the corresponding SSIs for the NSSAI of the first type of network slices in the respective TA.

6. The method as claimed in claim 3, wherein when the set partition granularity comprises taking the RA as the granularity, configuring the corresponding SSIs for the NSSAI of the first type of network slices based on the set partition granularity comprises:
determining, according to a number of first type of network slices in respective RA, an SSI length in the respective RA; and
based on the SSI length in the respective RA, uniformly configuring the corresponding SSIs for the NSSAI of the first type of network slices in the respective RA.

7. The method as claimed in claim 3, wherein when the set partition granularity comprises taking the UE as the granularity, configuring the corresponding SSIs for the NSSAI of the first type of network slices based on the set partition granularity comprises: uniformly configuring the SSIs for the NSSAI of the first type of network slices corresponding to the UE.

8. The method as claimed in claim 1, wherein the method further comprises:
receiving, from the UE, NSSAI of a second type of network slices, as well as corresponding SSIs configured by the UE for the NSSAI of the second type of network slices, wherein the second type of network slices are network slices, for which the UE requests to configure corresponding SSIs for NSSAI, comprised in registered network slices or network slices configured for the UE.

9. The method as claimed in claim 8, wherein in a case where only an access device receives the NSSAI of the second type of network slices and the corresponding SSIs configured by the UE for the NSSAI of the second type of network slices, the corresponding SSIs configured by the UE for the NSSAI of the second type of network slices are only applied to an Access Stratum (AS);

in a case where only a Core Network (CN) device receives the NSSAI of the second type of network slices and the corresponding SSIs configured by the UE for the NSSAI of the second type of network slices, the corresponding SSIs configured by the UE for the NSSAI of the second type of network slices are only applied to a Non-Access Stratum (NAS); and in a case where an access device and a CN device receive the NSSAI of the second type of network slices and the corresponding SSIs configured by the UE for the NSSAI of the second type of network slices, the corresponding SSIs configured by the UE for the NSSAI of the second type of network slices are applied to an AS and an NAS.

10. The method as claimed in claim 8, wherein the method further comprises:

receiving NSSAI of unregistered network slices and corresponding SSIs configured by the UE for the NSSAI of the unregistered network slices, which are sent after the UE is registered successfully.

11. A method for configuring network slice indexes, being applied to User Equipment (UE) and comprising:

receiving a downlink message bearing Network Slice Selection Assistance Information (NSSAI) and corresponding Shortened Slice Indexes (SSIs) of a first type of network slices, wherein NSSAI of a network slice and an SSI corresponding to the NSSAI indicate the same network slice, and a length of the NSSAI is longer than a length of the SSI corresponding to the NSSAI;

wherein the first type of network slices comprises registered network slices or network slices configured for the UE; and receiving the downlink message bearing the NSSAI and the corresponding SSIs of the first type of network slices comprises: receiving a registration response message bearing the NSSAI and the corresponding SSIs of the registered network slices to the UE.

12. User Equipment (UE), comprising: a second network interface, a second memory and a second processor, wherein the second network interface is configured to conduct signal reception and transmission in processes of receiving information from or sending information to other external network elements;

the second memory is configured to store a computer program capable of being operated on the second processor; and the second processor is configured to execute operations of the method as claimed in claim 11 when operating the computer program.

13. A computer storage medium, wherein the computer storage medium stores a program for configuring network slice indexes, and the program for configuring the network slice indexes implements, when being executed by at least one processor, operations of the method as claimed in claim 11.

14. A network side device, comprising: a first network interface, a first memory and a first processor, wherein the first network interface is configured to conduct signal reception and transmission in processes of receiving information from or sending information to other external network elements;

the first memory is configured to store a computer program capable of being operated on the first processor; and the first processor is configured to execute operations of the method as claimed in claim 1 when operating the computer program.

15. A computer storage medium, wherein the computer storage medium stores a program for configuring network slice indexes, and the program for configuring the network slice indexes implements, when being executed by at least one processor, operations of the method as claimed in claim 1.

16. The method as claimed in claim 11, wherein the method further comprises:

configuring corresponding SSIs for NSSAI of a second type of network slices, wherein the second type of network slices are network slices, for which the UE requests to configure the corresponding SSIs for the NSSAI, comprised in registered network slices or network slices configured for the UE; and sending the NSSAI and the corresponding SSIs of the second type of network slices to the network side device.

17. The method as claimed in claim 16, wherein in a case where the NSSAI and the corresponding SSIs of the second type of network slices are sent to an access device only, the SSIs corresponding to the NSSAI of the second type of network slices are only applied to an Access Stratum (AS);

in a case where the NSSAI and the corresponding SSIs of the second type of network slices are sent to a Core Network (CN) device only, the SSIs corresponding to the NSSAI of the second type of network slices are only applied to a Non-Access Stratum (NAS);

in a case where the NSSAI and the corresponding SSIs of the second type of network slices are sent to an access device and a CN device, the SSIs corresponding to the NSSAI of the second type of network slices are applied to an AS and an NAS.

18. The method as claimed in claim 16, wherein the method further comprises:

configuring corresponding SSIs for NSSAI of unregistered network slices; and sending the NSSAI of the unregistered network slices and the SSIs corresponding to the NSSAI of the unregistered network slices to the network side device.

* * * * *